(12) United States Patent
Equit et al.

(10) Patent No.: US 9,541,204 B2
(45) Date of Patent: Jan. 10, 2017

(54) VALVE MANIFOLD

(75) Inventors: Alexander Equit, Berlin (DE); Ralf Kettemann, Neuenstein-Kirschensall (DE)

(73) Assignee: Buerkert Werke GmbH, Ingelfingen (DE)

( * ) Notice: Subject to any disclaimer, the term of this patent is extended or adjusted under 35 U.S.C. 154(b) by 1281 days.

(21) Appl. No.: 13/046,998

(22) Filed: Mar. 14, 2011

(65) Prior Publication Data

US 2011/0226365 A1 Sep. 22, 2011

(30) Foreign Application Priority Data

Mar. 16, 2010 (DE) .................... 20 2010 003 665 U (51) Int. Cl.
| | | |
|---|---|---|
| *F16K 11/20* | (2006.01) | |
| *E03B 1/00* | (2006.01) | |
| *G05D 16/06* | (2006.01) | |
| *F16K 1/00* | (2006.01) | |
| *F16K 3/00* | (2006.01) | |
| *F16K 5/00* | (2006.01) | |
| *F16K 7/00* | (2006.01) | |
| *F16K 11/00* | (2006.01) | |

(Continued)

(52) U.S. Cl.
CPC .............. *F16K 7/14* (2013.01); *F16K 11/022* (2013.01); *F16K 11/20* (2013.01); *F16K 11/207* (2013.01); *F16K 27/0236* (2013.01); *F16K 7/126* (2013.01); *F16K 7/16* (2013.01); *F16K 11/10* (2013.01); *Y10T 137/877* (2015.04)

(58) Field of Classification Search
CPC .................... Y10T 137/86107; Y10T 137/877; Y10T 137/87877; Y10T 137/87885; Y10T 137/87917; F16K 7/126; F16K 7/16; F16K 11/00; F16K 11/10; F16K 11/20
USPC .......................... 137/597, 861, 883, 884, 613
See application file for complete search history.

(56) References Cited

U.S. PATENT DOCUMENTS

| | | | |
|---|---|---|---|
| 5,706,859 A | 1/1998 | Backlund | |
| 5,971,025 A | 10/1999 | Bäcklund | |

(Continued)

FOREIGN PATENT DOCUMENTS

| | | |
|---|---|---|
| EP | 0684535 | 5/1995 |
| EP | 0972148 | 3/2004 |

OTHER PUBLICATIONS

German Search Report dated Jul. 11, 2011.

(Continued)

*Primary Examiner* — Mary McManmon
*Assistant Examiner* — Hailey K Do
(74) *Attorney, Agent, or Firm* — Carlson, Gaskey & Olds, PC (57) ABSTRACT

A valve manifold has a housing with a central mixing chamber and a shell surface. The shell surface of the valve manifold has at least two valve ports, with each valve port being associated with one valve. A first valve port has three openings, and additional valve ports each having three openings. A respective first opening of the valve ports is in direct fluid communication with the central mixing chamber, and the second and third openings of the valve ports are each in fluid communication with an inflow or outflow via a duct. A bottom of the mixing chamber, in relation to a plane arranged perpendicularly to a vertical longitudinal axis of the housing, has a slope towards the first opening of the first.

19 Claims, 5 Drawing Sheets

(51) Int. Cl.
*F16K 15/00* (2006.01)
*F16K 17/00* (2006.01)
*F16K 7/14* (2006.01)
*F16K 11/02* (2006.01)
*F16K 27/02* (2006.01)
F16K 7/16 (2006.01)
F16K 11/10 (2006.01)
F16K 7/12 (2006.01)

(56) References Cited

U.S. PATENT DOCUMENTS

| | | | |
|---|---|---|---|
| 6,234,203 B1 | 5/2001 | Bäcklund | |
| 6,237,637 B1 | 5/2001 | Kovacs et al. | |
| 6,250,332 B1 * | 6/2001 | Backlund | 137/597 |
| 6,397,887 B1 * | 6/2002 | Crissman et al. | 137/597 |
| RE42,084 E * | 2/2011 | Backlund | 137/883 |
| 2005/0252562 A1 | 11/2005 | Muller | |

OTHER PUBLICATIONS

Extended European Search Report and Written Opinion from correseponding European Application No. EP 11 00 219 mailed Nov. 5, 2013.

\* cited by examiner

VALVE MANIFOLD

RELATED APPLICATION

This application claims priority to German Application No. 20 2010 003 665.8, which was filed Mar. 16, 2010.

FIELD OF THE INVENTION

The present invention relates to a valve manifold having a housing, the housing including a central mixing chamber and a shell surface.

BACKGROUND

Valve manifolds are used for mixing different liquids. The valve manifold has a plurality of inflows through which different liquids or gases can be supplied, and one or more outflows through which the liquids or gases can leave the valve manifold. The inflows into the central mixing chamber and the outflows out of the central mixing chamber are controlled by diaphragm valves which can shut off the inflows into or the outflows from the central mixing chamber.

EP 0 972 148 B1 discloses a diaphragm valve which is adapted to individually shut or open two inflows to and two outflows from a central chamber, so that two inflows or outflows can be controlled by a common valve.

In order to be able to utilize such a valve manifold in the food industry or in a low-germ or sterile environment, for example, it must be ensured that the valve manifolds can be cleaned and rinsed to be residue-free.

It is therefore important to provide a valve manifold which allows a simple and residue-free cleaning of the valve manifold.

SUMMARY

A valve manifold is provided with a housing that includes a central mixing chamber and a shell surface. The shell surface of the valve manifold has at least two ports that are each associated with one valve. The valve ports each have three openings, a respective first opening of a valve port being in direct fluid communication with the central mixing chamber and second and third openings of the valve ports each being in fluid communication with an inflow or outflow via a duct. The bottom of the mixing chamber, in relation to a plane arranged perpendicularly to a vertical longitudinal axis of the housing, has a slope towards the first opening of the first valve port. In the installed state of the valve manifold, the longitudinal axis is disposed to be vertical, so that a plane arranged perpendicularly to the longitudinal axis extends horizontally. Since the bottom of the mixing chamber has a slope with respect to this horizontal plane, a liquid, following gravity, will flow from the mixing chamber towards the first valve port. The central mixing chamber will thus empty itself automatically towards the first valve port after the rinsing process. It is therefore reliably excluded that liquid residues are left behind after the rinsing of the mixing chamber.

The bottom of the mixing chamber preferably has a constant slope, so that no valleys are present in the bottom of the mixing chamber for any residual liquids to remain behind.

Ideally, the slope is on the order of 3° to 10°, so that a sufficient flow towards the first valve port is ensured.

To make sure that the valve manifold is quickly emptied, at least one opening of the first valve port may be in fluid communication with an outflow, for example. Upon opening of the valve, the liquid or a rinsing medium can flow off directly from the valve manifold between the first opening and the opening connected with the outflow, so that a fast, independent emptying of the central mixing chamber is possible.

To ensure that the liquid or the rinsing medium flows out of the mixing chamber, the opening of the first valve port in communication with the outflow is preferably arranged lower than the lowest point of the mixing chamber.

To ensure the automatic emptying of the mixing chamber, the ducts which are in fluid communication with an outflow have a slope from the respective valve port to the outflow, in relation to a plane arranged perpendicularly to the longitudinal axis of the housing. This makes sure that no liquid residues are left in these ducts and that the ducts communicating with an outflow can be emptied without any residue left behind.

In one example, the ducts which are in fluid communication with an inflow have a slope, in relation to a plane arranged perpendicularly to the longitudinal axis of the housing, from the inflow to the respective opening of the valve port. In connection with the self-emptying mixing chamber and/or the self-emptying ducts which are in fluid communication with an outflow, a valve manifold is obtained in this way which is completely self-emptying. With the valves in the open condition, the liquid, following gravity, can be conducted from the ducts connected with an inflow via the self-emptying mixing chamber to an outflow or directly from an inflow to an outflow. After the rinsing or cleaning process, the entire valve manifold will empty itself automatically, so that no liquid residues will remain behind in the manifold.

The valve manifold may be provided with an external port, for example, which is in direct fluid communication with the mixing chamber via a duct. This duct may be used to conduct a liquid or a cleaning medium into the central mixing chamber, independently of the control of the valves.

To obtain the self-emptying function of the valve manifold, the duct which is in fluid communication with an external port has a slope towards the mixing chamber in relation to a plane arranged perpendicularly to a longitudinal axis of the housing.

All of the ducts preferably have a constant slope or a constantly increasing slope, so that no valleys are present in the ducts for any liquid residues to collect.

The shell surface has at least two side faces, for example, a valve port being provided on each side face. The side faces are flat, at least in sections, so that a valve can be tightly connected to the valve port. The side faces on which the valve ports are provided are preferably arranged evenly distributed on the periphery of the shell surface. This ensures that the valves will not impede each other when they are connected to the valve manifold and are easily accessible.

It is conceivable, for example, that two side faces are provided which are disposed opposite each other in the peripheral direction.

The openings of a valve port are, for example, arranged one behind the other in the direction of the longitudinal axis, i.e. in the installed state of the valve manifold, the openings are located one above the other in the vertical direction. This ensures that a liquid, following gravity, can flow from one opening into the openings located underneath.

But it is also conceivable that the openings of a valve port are arranged side by side in the direction of the longitudinal axis, that is, are arranged horizontally side by side in the installed condition of the valve manifold.

For attachment of the individual valves, attachment devices, in particular boreholes, are preferably provided on the shell surface, to which the valves may be attached.

BRIEF DESCRIPTION OF THE DRAWINGS

Further advantages and features will be apparent from the description below in conjunction with the accompanying drawings, in which.

DETAILED DESCRIPTION

Figure 1:
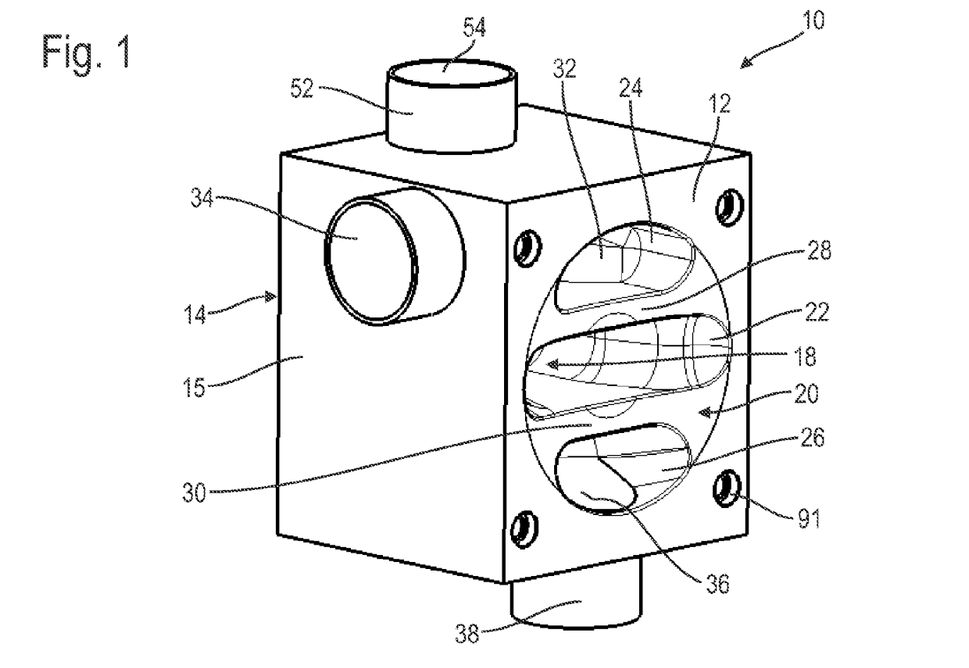
FIG. 1 shows a first embodiment of a valve manifold for an assembly according to the invention.
Figure 2:
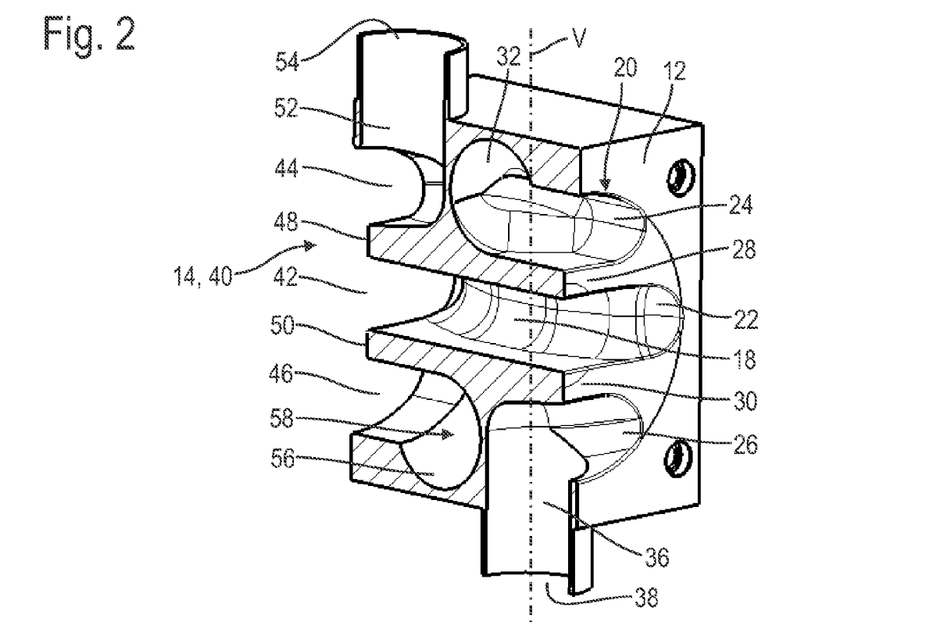
FIG. 2 shows a vertical sectional view of the valve manifold of FIG. 1.

The first embodiment of a valve manifold 10 shown in FIGS. 1 and 2 has a central mixing chamber 18 for mixing different liquids or gases, and two side faces 12, 14 which are arranged here in a diametrically opposed relationship on the shell surface 15 of the valve manifold 10.

Provided on the first side face 12 is a first valve port 20 which has three openings 22, 24, 26 which are each separated from each other by webs 28, 30. The first opening 22 is in direct fluid communication with the central mixing chamber 18. The second opening 24 communicates with an inflow 34 via a duct 32. The third opening 26 communicates with an outflow 38 via a duct 36.

Ports that are arranged fluidically upstream of the central mixing chamber 18 in the installed state of the valve manifold 10, that is, are arranged above the central mixing chamber 18 as related to a vertical longitudinal axis V in the installed state of the valve manifold, are referred to as inflows here. Ports that are arranged fluidically downstream of the central mixing chamber 18, that is, are located below the central mixing chamber 18 as related to the vertical longitudinal axis V in the installed state, are correspondingly referred to as outflows. But it is also conceivable to feed a liquid into the valve manifold 10 via an outflow, i.e. a port arranged below the central mixing chamber 18

By analogy with the first side face 12, the second side face 14 has a second valve port 40 provided thereon which has a first opening 42, a second opening 44, and a third opening 46 which are each separated from each other by webs 48, 50. Here, too, the first opening 42 is in direct fluid communication with the central mixing chamber 18. The second opening 44 communicates with an inflow 54 via a duct 52. The third opening 46 communicates with an outflow 58 via a duct 56.

Each side face 12, 14 is provided with attachment devices 91, in this case boreholes, to attach a diaphragm valve to the respective valve port 20, 40. The function of the diaphragm valve will be explained below with reference to the first valve port 20:

The diaphragm valve has a diaphragm which can be pressed both against the first web 28 and against the second web 30 by a control. When the diaphragm is pressed against both webs 28, 30, the diaphragm valve shuts off the complete valve port 20, so that all openings 22, 24, 26 are shut off. When the diaphragm is pressed only against the first web 28, the first opening 22 and the third opening 26 are in fluid communication. When the diaphragm is pressed against the second web 30, the first opening 22 is in fluid communication with the second opening 24. When the diaphragm does not rest against either of the first web 28 and the second web 30, all three of the openings 22, 24, 26 are in fluid communication with each other.

Each valve or each valve port 20, 40 can thus be used to control two inflows or outflows 34, 38, 54, 58 each. In the valve manifold shown here, four outflows or inflows 34, 38, 54, 58 can therefore be controlled using only two valves. Since a medium can be introduced into the central mixing chamber 18 via each of the inflows 34, 54 or outflows 38, 58, it is possible to feed a liquid into the central mixing chamber 18 via three inflows (assuming that at least one outflow is necessary). As a result, a mixing of up to three liquids is possible using only two valves.

For cleaning the valve manifold 10, a cleaning medium is introduced into the valve manifold via an inflow 34, 54 or an outflow 38, 58. Subsequently, the valves are opened to drain the cleaning medium. To prevent the cleaning medium or any other medium from causing any impurities in the central mixing chamber 18 or in the valve manifold 10, no residues of the cleaning medium or other medium may remain in the valve manifold after the cleaning process. This is evidenced by using a riboflavin test, for example. In a riboflavin test the entire valve manifold 10 is sprayed with a highly adhesive, fluorescent liquid and is tested for any residues of the fluorescent liquid after a cleaning cycle.

By switching the valves appropriately, a cross flow-through from the inflow 34 to the outflow 58 and subsequently from the inflow 54 to the outflow 38 is possible in the valve manifold according to the first embodiment. In this way, the interior space of the valve manifold can be completely cleaned, which is a great advantage over the prior art.

Figure 3:
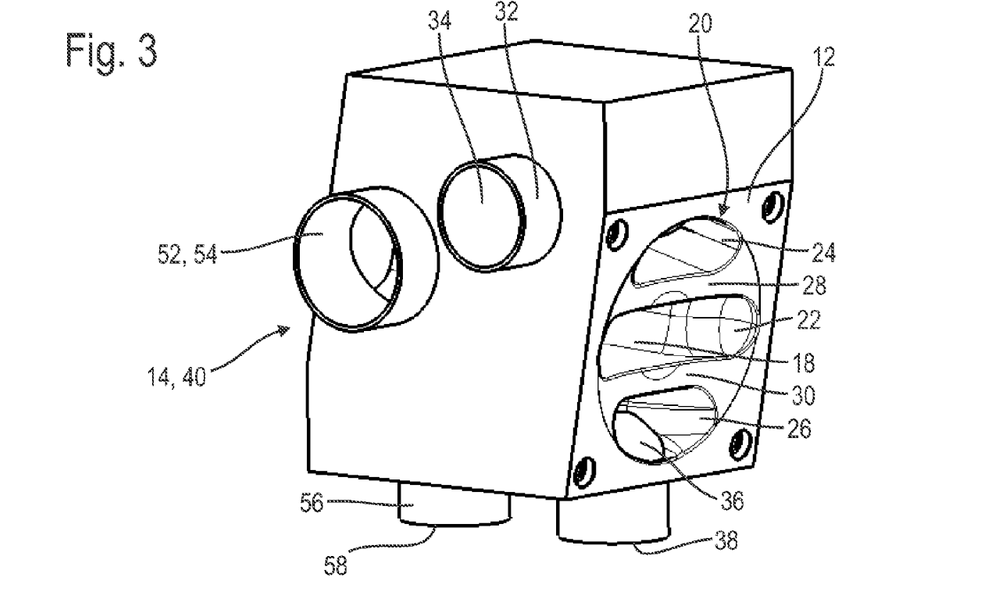
FIG. 3 shows a second embodiment of a valve manifold for a valve assembly according to the invention.
Figure 4:
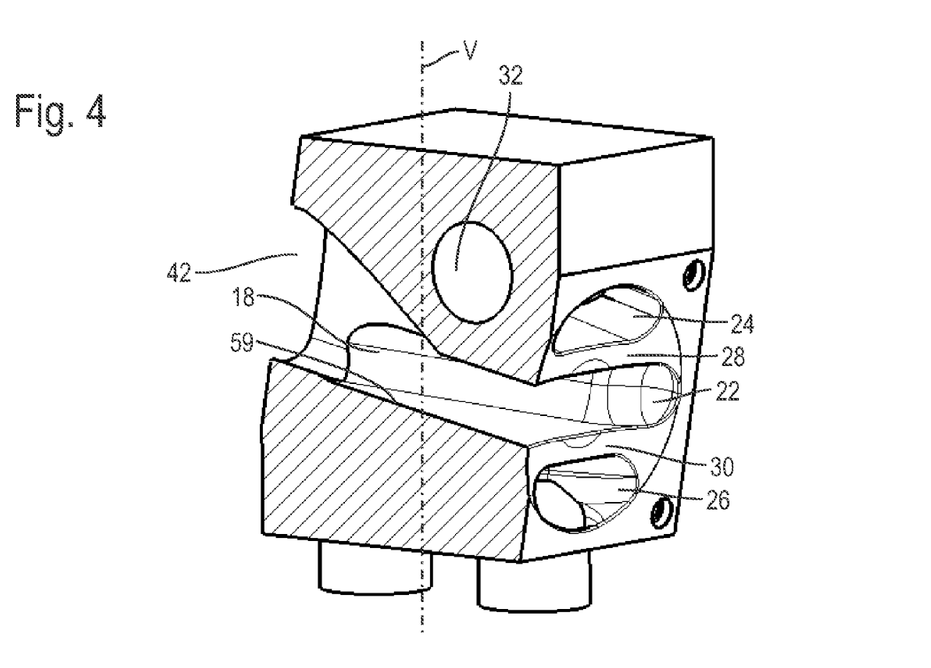
FIG. 4 shows a vertical sectional view of the valve manifold of FIG. 3.
Figure 5:
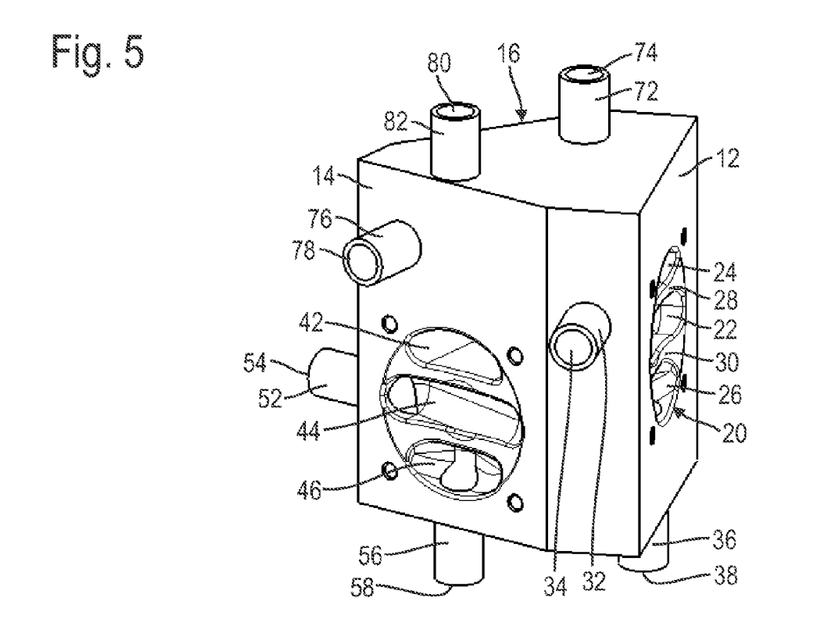
FIG. 5 shows a third embodiment of a valve manifold.

FIGS. 3 and 4 show a second embodiment of the valve manifold 10, which substantially corresponds to the valve manifold shown in FIGS. 1 and 2 with regard to its structure. However, unlike in the first embodiment, the inflow 34, which communicates with the second opening 24 of the first valve port, is provided on the shell surface 15 of the valve manifold 10.

The valve manifold 10 here includes a central mixing chamber 18 having a bottom 59 which has a slope in relation to a plane arranged perpendicularly to the vertical longitudinal axis V of the valve manifold 10. The bottom 59 of the mixing chamber 18 is inclined toward the first opening 22 of the first valve port 20, so that when the valves are open, a medium, following gravity, flows from the central mixing chamber 18 to the first opening 22 of the first valve port 20. With the valve in the open condition, the medium can flow from the first opening 22 into the third opening 26 and thus flow off to the outflow 38. The central mixing chamber 18 is therefore self-emptying when the valves are open, i.e. no further operating steps are required for cleaning or for a complete emptying of the central mixing chamber 18.

The ducts 32, 36, 52, 56 likewise each show a slope to the respective valve port 20, 40. Upon opening of the valves, the ducts 32, 52, following gravity, empty themselves into the central mixing chamber 18 via the respective valve port 20, 40. Owing to the slope of the bottom 59, the central mixing chamber 18 empties itself to the third opening 26 of the first valve port 20 and thus into the outflow 38.

The ducts 32, 36, 52, 56 and the bottom 59 of the central mixing chamber 18 here have a constant slope or a slope that constantly increases towards the respective valve port 20, 40, i.e. the ducts 32, 36, 52, 56 and the central mixing chamber 18 do not have any valleys in which any residual liquids may collect.

This means that when the valves are fully open, the valve manifold 10 is self-emptying, i.e. upon opening of the valves, a complete emptying of the valve manifold 10 takes place. In a riboflavin test, no liquid residues could be detected in the valve manifold 10 after a cleaning process.

FIGS. 5 to 9 show a third embodiment of a valve manifold 10 having a central mixing chamber 18. The valve manifold 10 shown here has three side faces 12, 14, 16 each having a respective valve port 20, 40, 60 arranged thereon.

The structure of the first valve port 20 substantially corresponds to that of the first valve port 20 illustrated in FIGS. 3 and 4. The valve port has three openings 22, 24, 26 which are separated from each other by webs 28, 30. The first opening 22 is in fluid communication with the central mixing chamber 18. The second opening 24 communicates with an inflow 34 via a duct 32, and the third opening 26 is in fluid communication with an outflow 38 via a duct 36. As can be seen in particular in FIG. 6, the second opening 24 communicates with a further inflow 35 via an additional duct 33.

The second valve port 40 is vertically offset here in relation to the first valve port 20, that is, it is located below the first valve port 20. Deviating from the exemplary embodiment illustrated in FIGS. 3 and 4, here the first opening 42 which communicates with the central mixing chamber 18 is arranged in the vertical direction above the second and third openings 44, 46. Here too, the second opening 44 is in communication with an inflow 54 via a duct 52, the inflow 54 being provided on the shell surface 15. The third opening 46 communicates with an outflow 58 via a duct 56.

Figure 6:
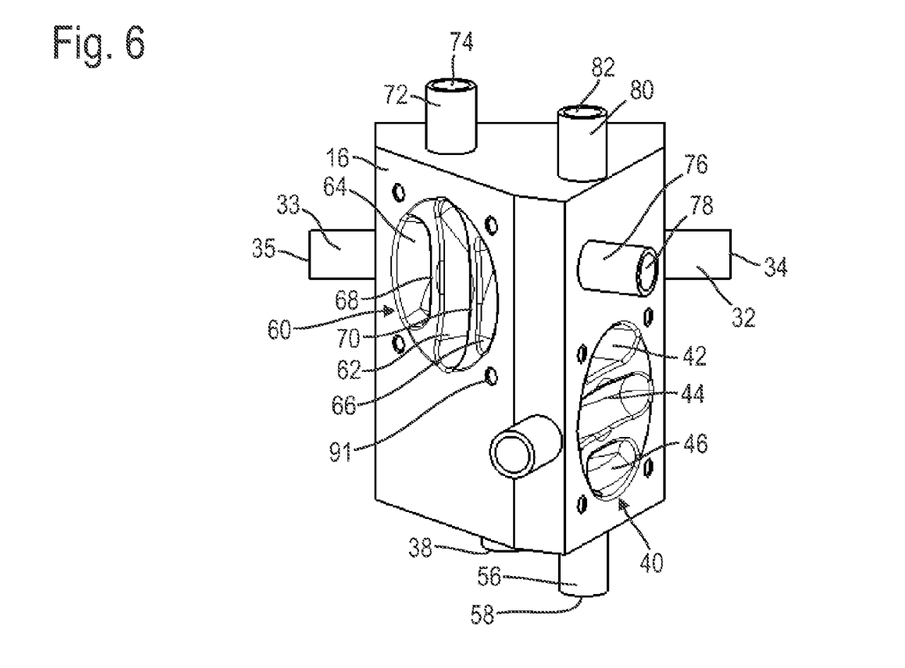
FIG. 6 shows a second view of the valve manifold of FIG. 5.
Figure 7:
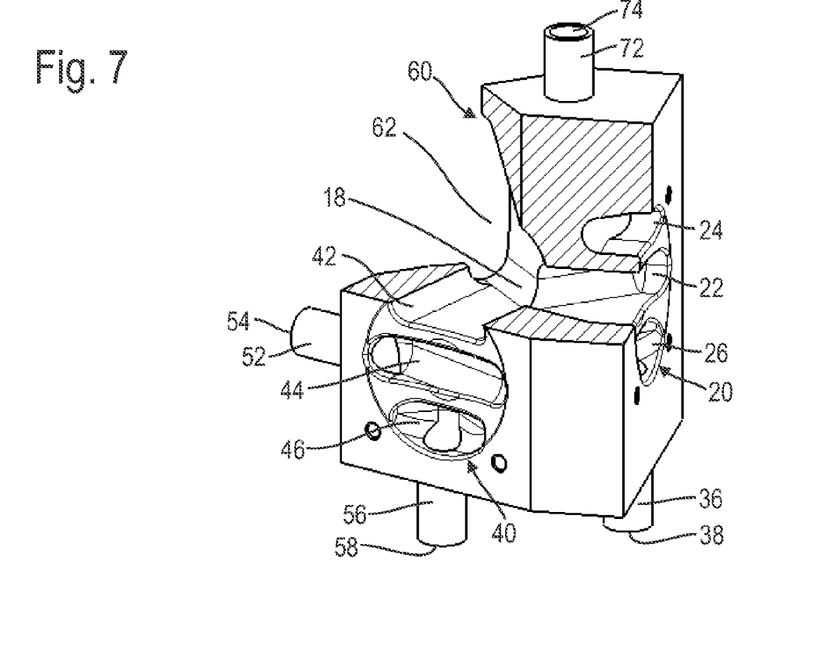
FIG. 7 shows a partial sectional view of the valve manifold of FIG. 5.
Figure 8:
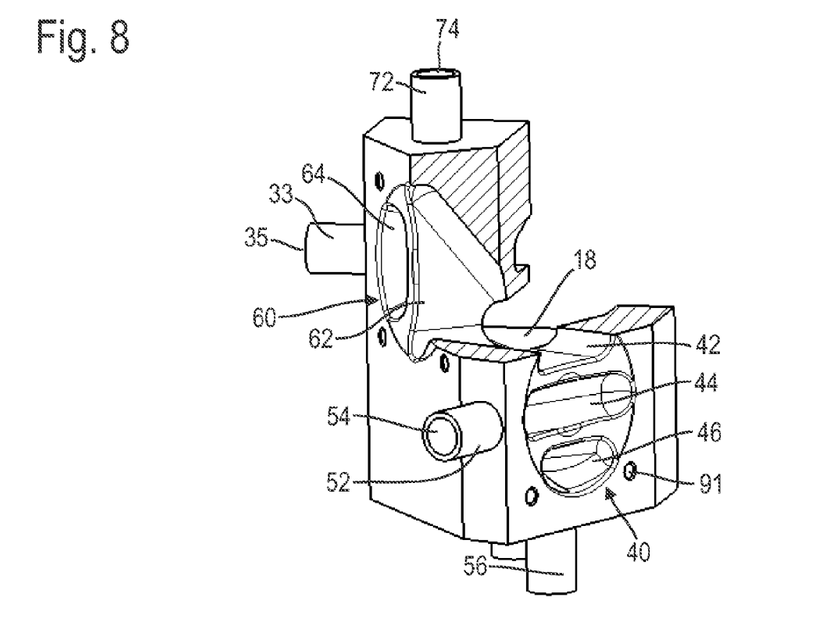
FIG. 8 shows a second partial sectional view of the valve manifold of FIG. 5.
Figure 9:
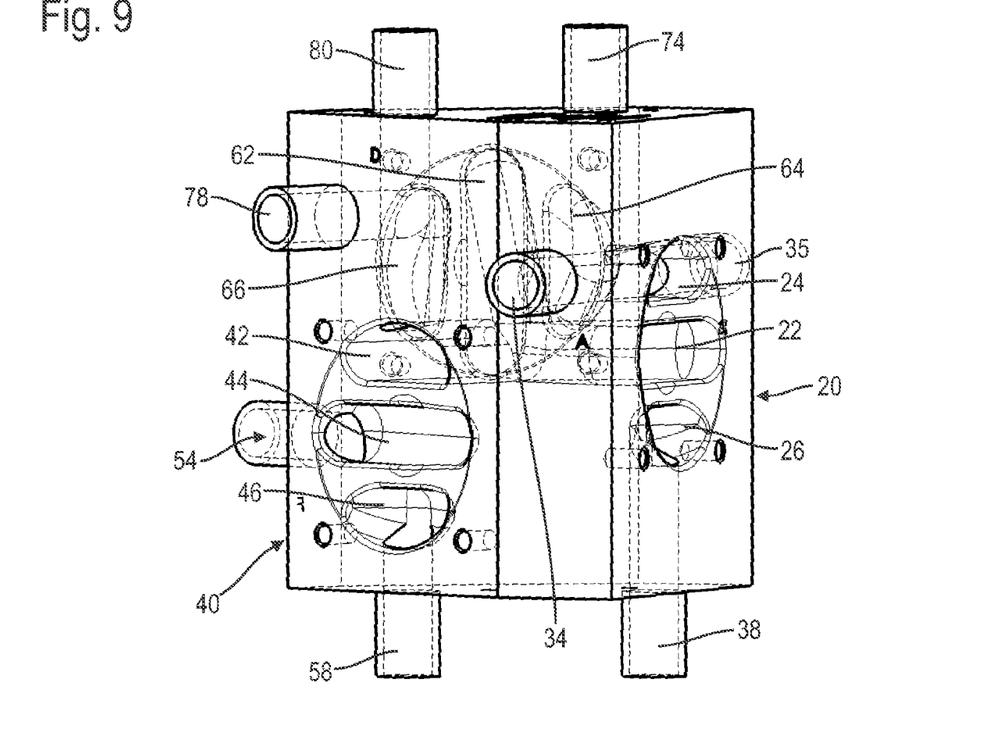
FIG. 9 shows a complete view of the valve manifold of FIG. 5.

As can be seen in particular in FIG. 6, the third valve port 60 likewise has three openings 62, 64, 66 which, in contrast to the first valve port 20 and the second valve port 40, are arranged side by side here, that is, the webs between the openings 62, 64, 66 extend in the direction of the vertical longitudinal axis V. Here, too, the first opening 62 is in fluid communication with the central mixing chamber 18. The second opening 64 and the third opening 66 are each in communication with an inflow 74, 78 via a duct 72, 76.

This means that the valve manifold 10 shown here has a total of six ports, or seven, as the case may be, which can be controlled by three valves. Assuming that one outflow is provided for the mixed liquid, it is therefore possible to introduce different liquids into the central mixing chamber 18 via five or six ports and to mix them, using three valves.

The advantage of the third embodiment according to FIGS. 5 to 9 over the second embodiment according to FIGS. 3 and 4 consists in that it is easier to clean.

In the valve manifold 10 illustrated in FIGS. 3 and 4, cleaning of the mixing chamber 18 requires, for one thing, removal of a port to be able to introduce the cleaning medium into the valve manifold. For another, a complete emptying of the valve manifold, i.e. including the valves and all outflows and inflows, is required.

Usually, however, it is only necessary to rinse the central mixing chamber 18 in order to avoid, in a new mixing process, any impurities caused by residues from the previous mixing process.

The valve manifold 10 illustrated in FIGS. 5 to 9 additionally has an external port 80 on the top side. This external port 80 is in direct fluid communication with the mixing chamber 18 via a duct 82. A cleaning medium can be directly introduced into the central mixing chamber 18 via this external port. To rinse the mixing chamber 18, it is merely required to open an outflow connected with the mixing chamber, preferably the lowermost outflow in the vertical direction.

In this way, no complete emptying of the ducts of the valve manifold 10 is necessary, so that a substantial amount of liquid may be saved. Further, the cleaning may be effected considerably faster and in a less complicated manner since it is not necessary to remove another port in order to introduce the rinsing fluid into the mixing chamber 18. For rinsing the mixing chamber 18 it is only required to open the communication between the first opening 22 and the third opening 26 on the first valve port 20, so that the cleaning medium can flow from the central mixing chamber 18 into the outflow 38.

Figure 10:
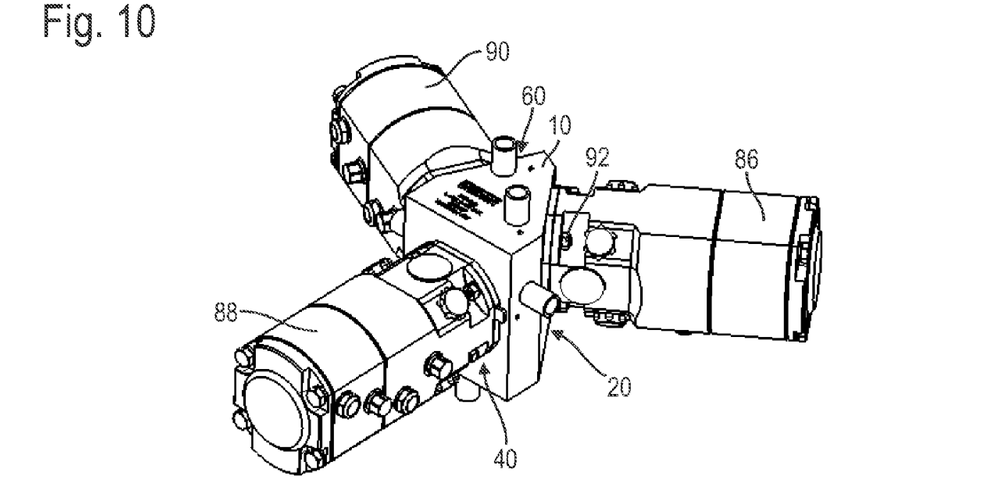
FIG. 10 shows a valve assembly according to the invention with the valve manifold of FIG. 5.

FIG. 10 shows a valve assembly 84 with a valve manifold 10 according to the invention. Each valve port 20, 40, 60 has a diaphragm valve 86, 88, 90 attached to it. Using suitable attachment structure, in this case bolts 92 for example, the diaphragm valves 86, 88, 90 are each attached to the attachment devices 91 on the side faces 12, 14, 16. Here, the side faces 12, 14, 16 are disposed evenly distributed on the periphery of the shell surface, so that as large an amount of space as possible is provided around the valves 86, 88, 90 or the side faces 12, 14, 16 for mounting, maintenance and/or dismounting of the valves 86, 88, 90. Deviating from this, however, any other desired arrangement of the valve ports 20, 40, 60 is also conceivable. Also, unlike in the exemplary embodiments illustrated here, the valve manifold 10 may also include more than three side faces 12, 14, 16.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A valve manifold comprising:
    a housing including a central mixing chamber and a shell surface, the shell surface having at least two valve ports provided thereon with each valve port being associated with one valve;
    a first valve port of the at least two valve ports having three openings and further valve ports of the at least two valve ports each having three openings;
    a respective first opening of each of the at least two valve ports being in direct fluid communication with the central mixing chamber and second and third openings of each of the at least two valve ports each being in fluid communication with an inflow or outflow via a duct; and
    a bottom of the mixing chamber, in relation to a plane arranged perpendicularly to a vertical longitudinal axis of the housing, has a slope towards the first opening of the first valve port so that a liquid, following gravity, will flow from the mixing chamber towards the first valve port so that the mixing chamber will empty automatically towards the first valve port.

2. The valve manifold according to claim 1, wherein the bottom of the mixing chamber has a constant slope.

3. The valve manifold according to claim 1, wherein the slope is in the order of 3° to 10°.

4. The valve manifold according to claim 1, wherein in relation to the plane arranged perpendicularly to the longitudinal axis of the housing, the ducts which are in fluid communication with an inflow have a slope from the inflow to the respective opening of the valve port.

5. The valve manifold according to claim 1, wherein the openings for each of the at least two valve ports are arranged one behind the other in a direction of the longitudinal axis.

6. The valve manifold according to claim 1, wherein the openings for each of the at least two valve ports are arranged side by side in a direction of the longitudinal axis.

7. The valve manifold according to claim 1, including attachment devices, comprising boreholes that are provided on the shell surface for attachment of a valve.

8. The valve manifold according to claim 1, wherein the bottom of the mixing chamber is defined by a constant slope that extends from one edge of the mixing chamber to an opposite edge of the mixing chamber.

9. The valve manifold according to claim 1, wherein at least one of the second and third openings of the first valve port is in fluid communication with an outflow.

10. The valve manifold according to claim 9, wherein the at least one of the second and third openings of the first valve port in communication with the outflow is arranged lower than a lowest point of the mixing chamber.

11. The valve manifold according to claim 1, wherein in relation to the plane arranged perpendicularly to the longitudinal axis of the housing, the ducts which are in fluid communication with an outflow have a slope from the respective valve port to the outflow.

12. The valve manifold according to claim 11, wherein the ducts have a constant slope or a constantly increasing slope.

13. The valve manifold according to claim 1, including an external port that is in direct fluid communication with the central mixing chamber via a duct.

14. The valve manifold according to claim 13, wherein the duct that is in fluid communication with the external port has a slope towards the central mixing chamber in relation to the plane arranged perpendicularly to the longitudinal axis of the housing.

15. The valve manifold according to claim 1, wherein the bottom of the mixing chamber is only sloped in one direction.

16. The valve manifold according to claim 15, wherein the one direction is towards the first valve port.

17. The valve manifold according to claim 1, wherein the shell surface has at least two side faces, with one valve port being provided on each side face.

18. The valve manifold according to claim 17, wherein the side faces are arranged evenly distributed on a periphery of the shell surface.

19. The valve manifold according to claim 17, wherein two side faces are provided which are disposed opposite each other in a peripheral direction.

* * * * *